Feb. 8, 1944.                N. FAY                2,341,028
                             DECOY
                        Filed June 16, 1941
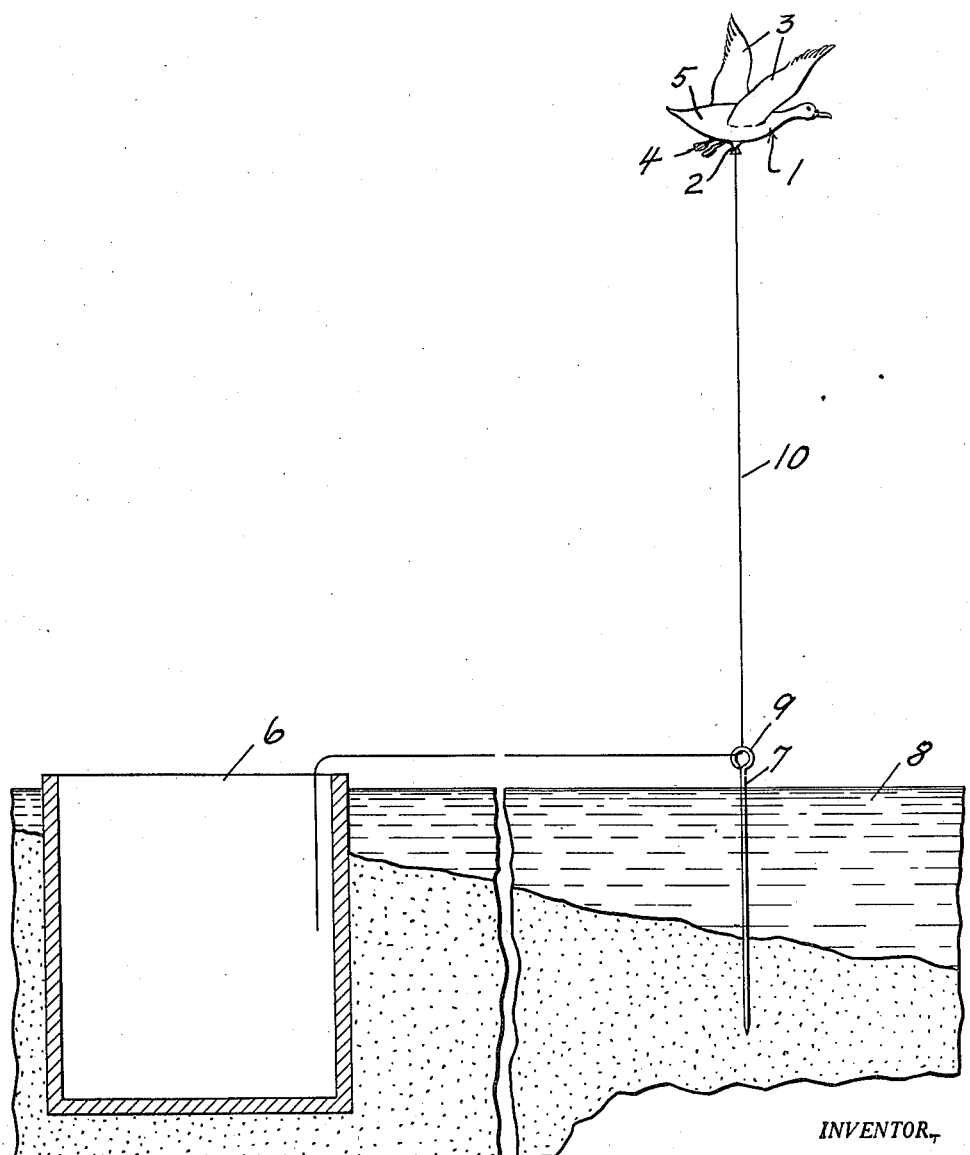
INVENTOR,
NORVIN FAY.
BY
*A. Schapp*
ATTORNEY.

Patented Feb. 8, 1944

2,341,028

UNITED STATES PATENT OFFICE 2,341,028

DECOY

Norvin Fay, San Francisco, Calif.

Application June 16, 1941, Serial No. 398,289

4 Claims. (Cl. 43—3)

The present invention relates to improvements in decoys, and has particular reference to decoys used for attracting wild fowl, such as ducks, geese, or other game birds.

At the present time, it is customary to use decoys made in simulation to the birds to be attracted which float upon the water at a distance from the duck blind, or other place of concealment used by the sportsman or hunter.

In the present invention it is proposed to provide a decoy which will fly in the air in simulation of a bird in flight.

It is further proposed to provide suitable anchoring and control means whereby the hunter, hidden in the blind, may raise or lower the decoy at will.

Another object of my invention is to provide a decoy of the character described which is lighter than air, and with wings spread, so as to respond readily to air currents, and to give the appearance of a bird in flight.

Further objects and advantages of my invention will appear as the specification proceeds, and the novel features thereof will be fully set forth in the claims hereto appended.

The preferred form of my invention is illustrated in the accompanying drawing, the single figure of which illustrates the decoy and the anchoring means in side elevation as applied in actual use.

While I have shown only the preferred form of the invention, I wish to have it understood that various changes or modifications may be made within the scope of the claims hereto attached, without departing from the spirit of the invention.

In its preferred form, my decoy 1 is made of rubber or similar material, in the form of a balloon filled with any suitable lighter-than-air gas. An intake orifice is indicated at 2, by means of which the balloon may be filled.

The balloon is shaped to simulate a wild duck, or other game bird, with wings spread, as at 3, and with feet 4 stretched rearward, and the wings and the feet are preferably inflated with the body 5 to cause the decoy to respond to air currents, and to thus more closely create the appearance of a bird in flight.

The duck blind is indicated at 6, and a peg or stake 7 is driven into the ground or bottom of the pond, shown at 8, the peg having an eyelet 9 above the surface of the water.

A cord or string 10 is attached to the decoy, as at 2, and is passed through the eyelet 9 and guided to the blind 6, so as to allow the hunter to operate the cord for raising and lowering the decoy.

It is apparent that the decoy may be made in many different forms, and may be suitably colored in imitation of the coloring of the game to be attracted, and may be balanced over the cord to assume the proper position in mid-air best adapted to attract the game, and to cause the same to alight on the water, or to come within shooting range.

I claim:

1. A lighter-than-air decoy comprising a balloon shaped to simulate a bird and filled with lighter-than-air gas, in combination with a stake secured in the ground surface and having an eyelet above the latter, and a cord attached to the decoy and passing through the eyelet, the cord being operable from a point spaced from the stake for raising and lowering the decoy.

2. A lighter-than-air decoy adapted for flying over a body of water, comprising a balloon shaped to simulate a bird and filled with lighter-than-air gas, in combination with an anchoring means secured to the ground surface underneath the water and having an eyelet above the surface of the water, and a cord suspended from the bird and passing through the eyelet and extending horizontally above the water to a remote point whereby a person located at the remote point may let out the cord to allow the bird to rise into the air with freedom of flying movement in response to air currents, and may pull down the bird to a position adjacent the eyelet.

3. A lighter-than-air decoy adapted for flying over a body of water, comprising a balloon shaped to simulate a bird and filled with lighter-than-air gas, in combination with an anchoring means having an eyelet above the surface of the water, and a cord suspended from the bird and passing through the eyelet and extending horizontally to a remote point whereby a person located at the remote point may let out the cord to allow the bird to rise into the air with freedom of flying movement in response to air currents and may pull down the bird to a position adjacent the eyelet.

4. A lighter-than-air decoy adapted for use in connection with a body of water and a hunter's blind disposed in operative relation thereto, the decoy comprising a balloon shaped to simulate a bird and filled with lighter-than-air gas, an anchoring means secured to the bottom underneath the body of water at a distance from the blind, and having an eyelet above the surface of the water and in close proximity thereto, and a cord suspended from the balloon and passing through the eyelet and extending horizontally to the blind, whereby a person located in the blind may let out the cord to allow the balloon to rise into the air with freedom of flying movement in response to air currents, and may pull down the balloon to a position adjacent the surface of the water.

NORVIN FAY.